Nov. 13, 1945.  R. L. BAZLEY ET AL  2,389,019
VERTICAL TURRET MACHINE TOOL
Filed May 25, 1940  12 Sheets-Sheet 8
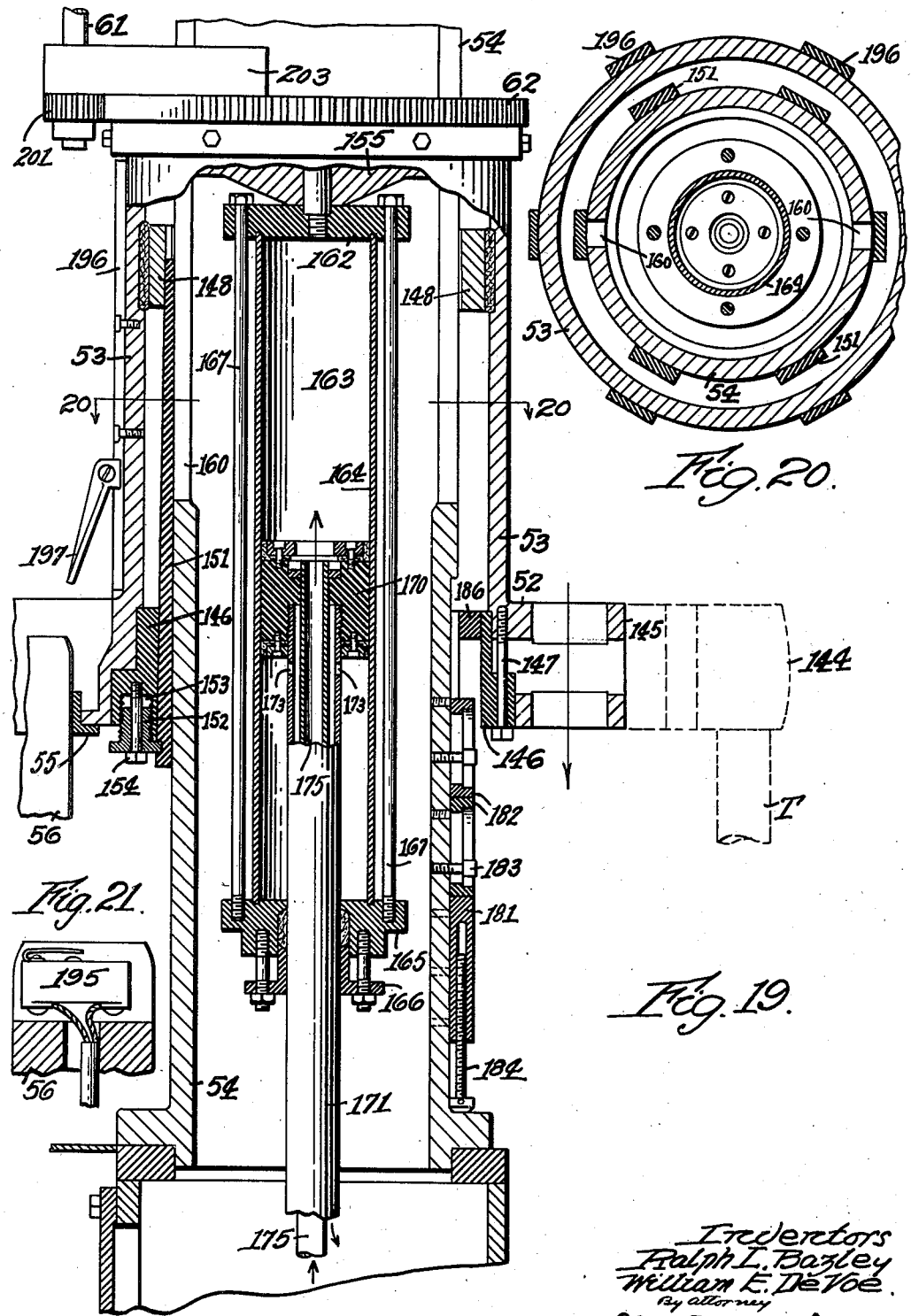

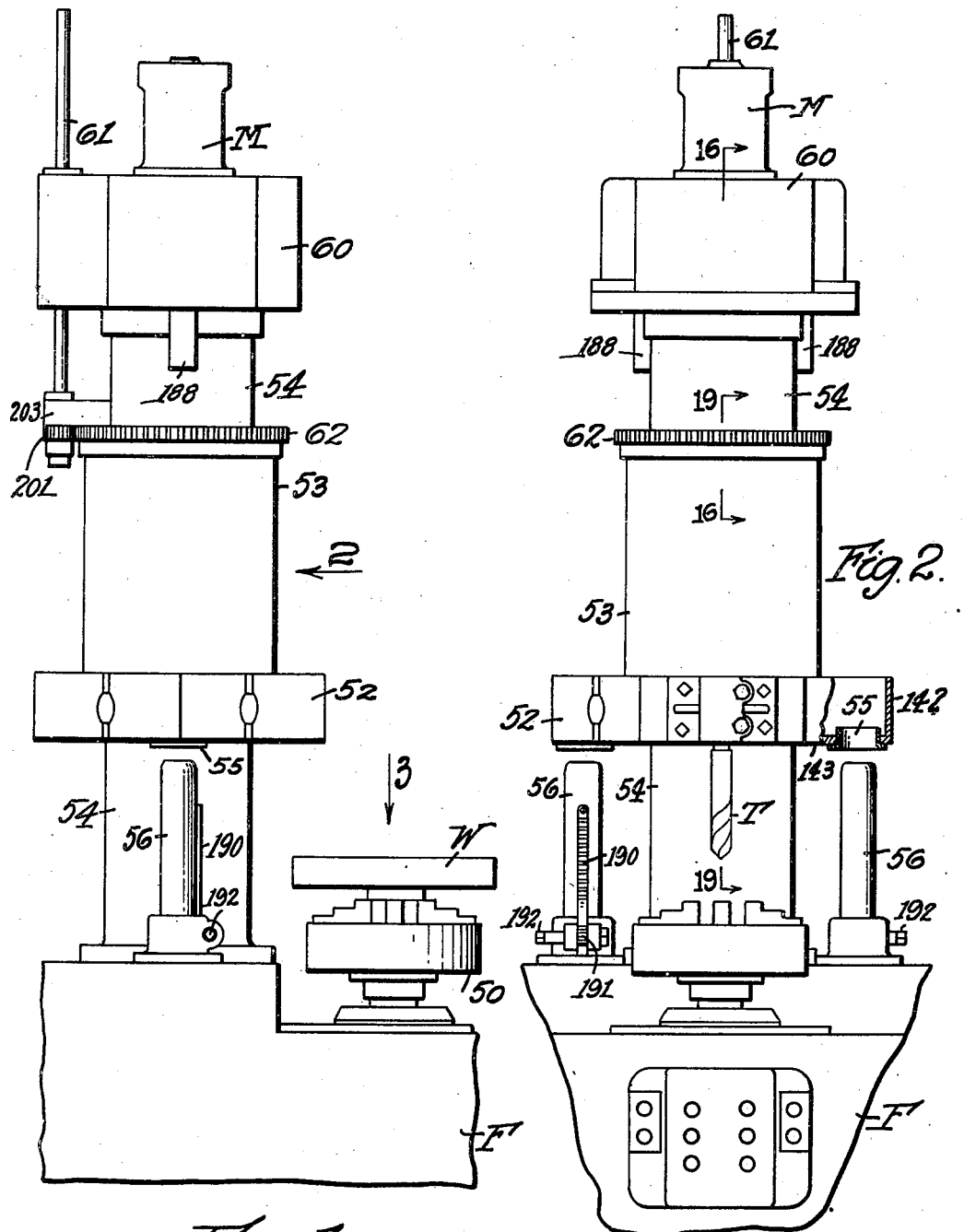

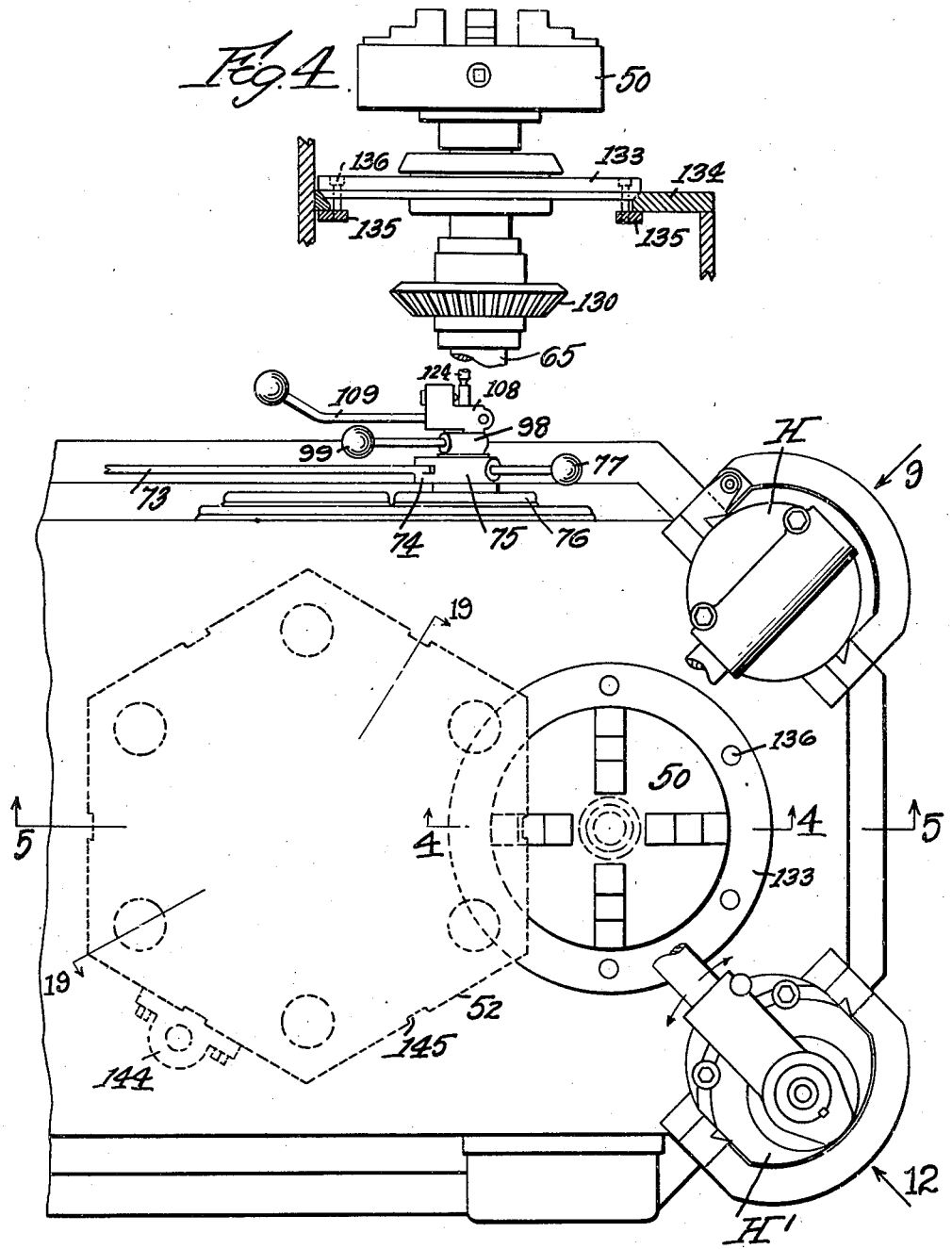

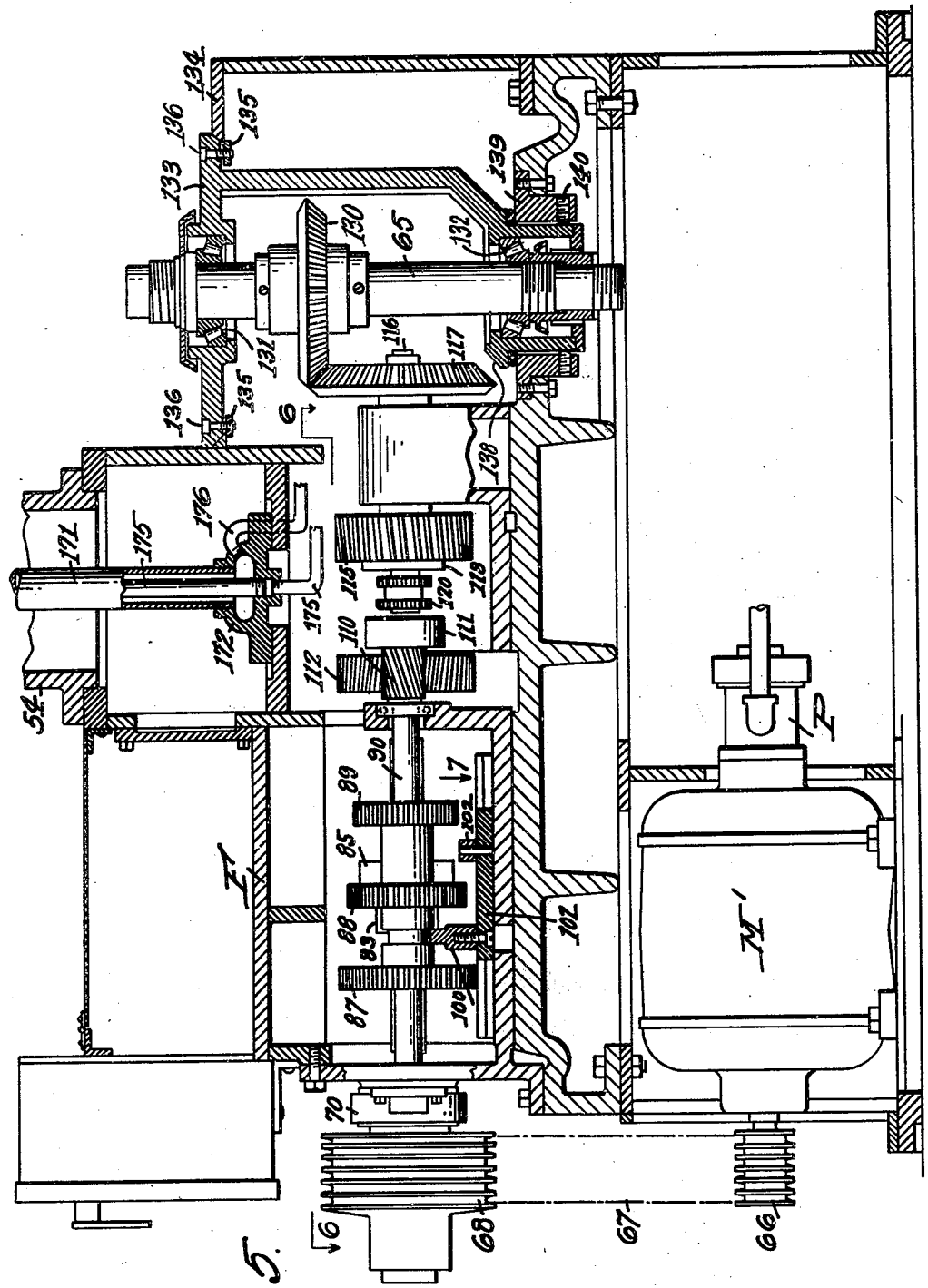

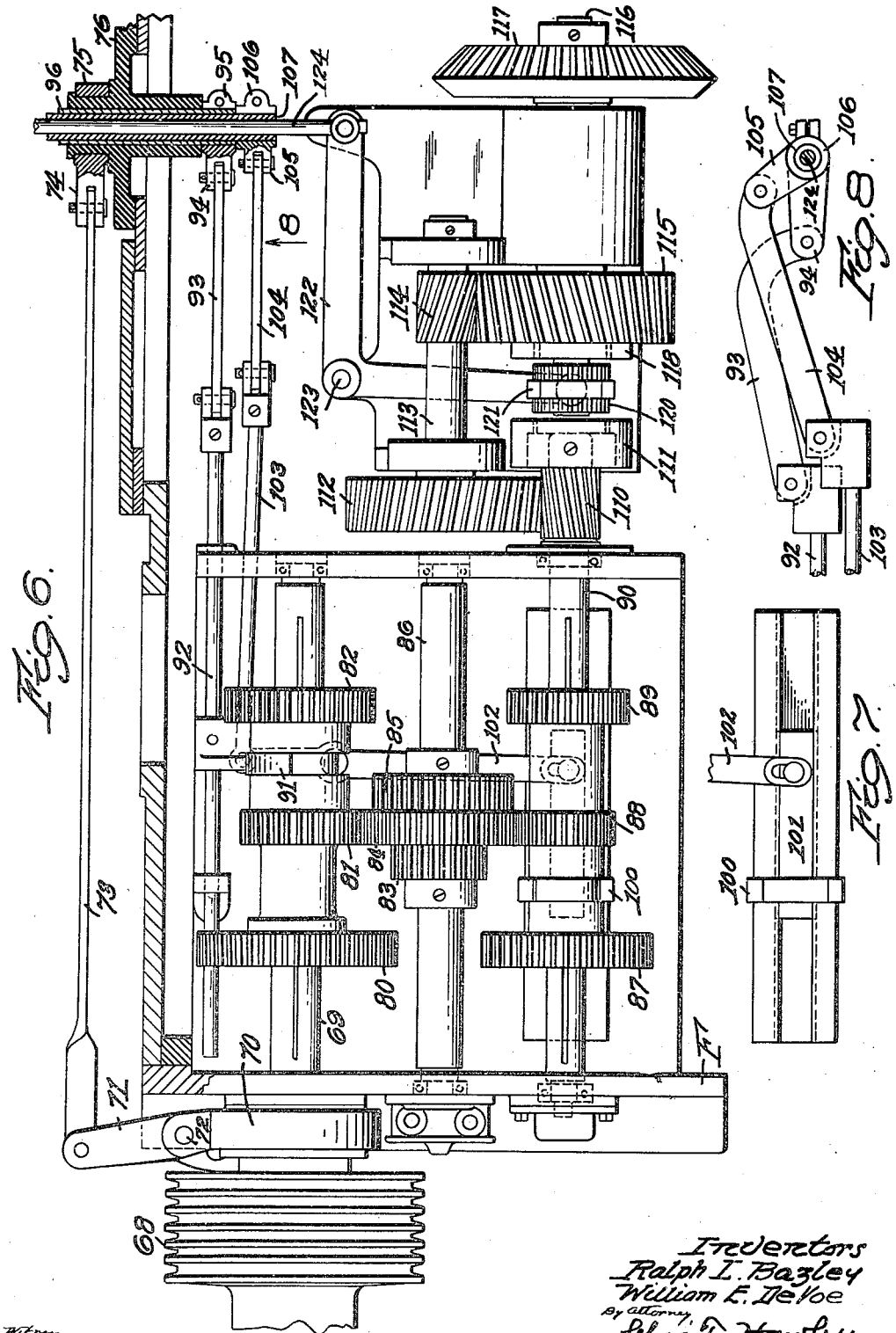

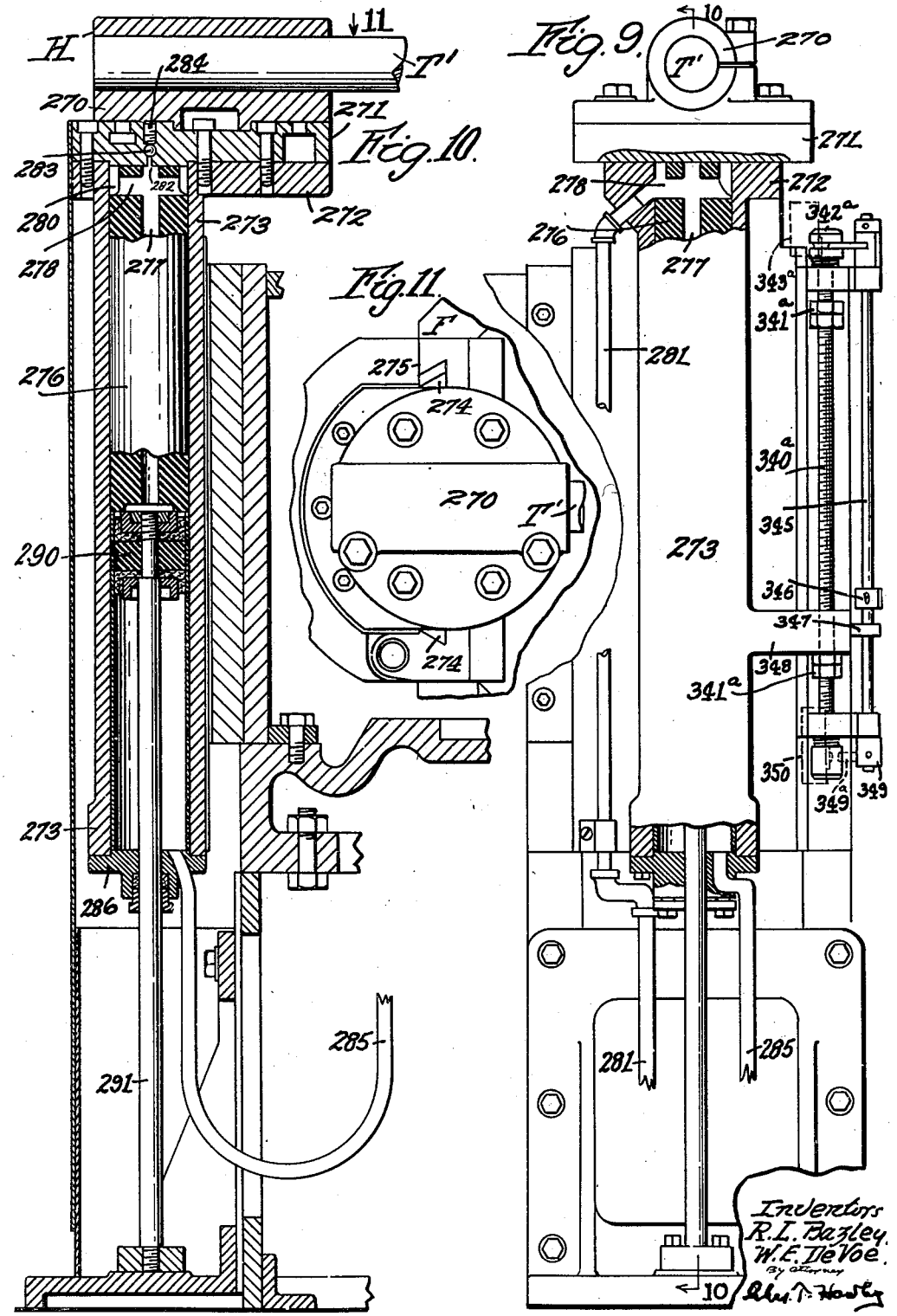

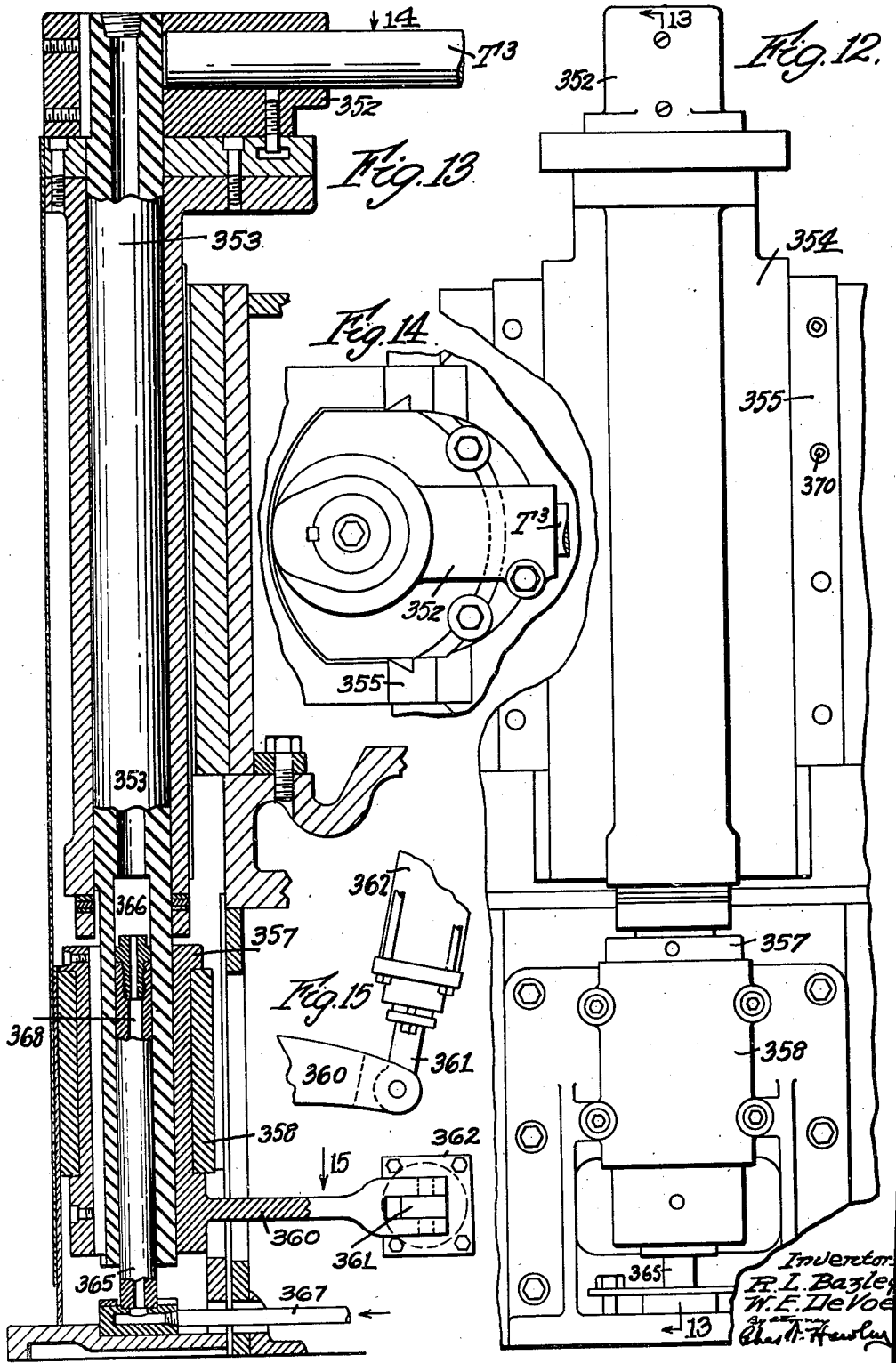

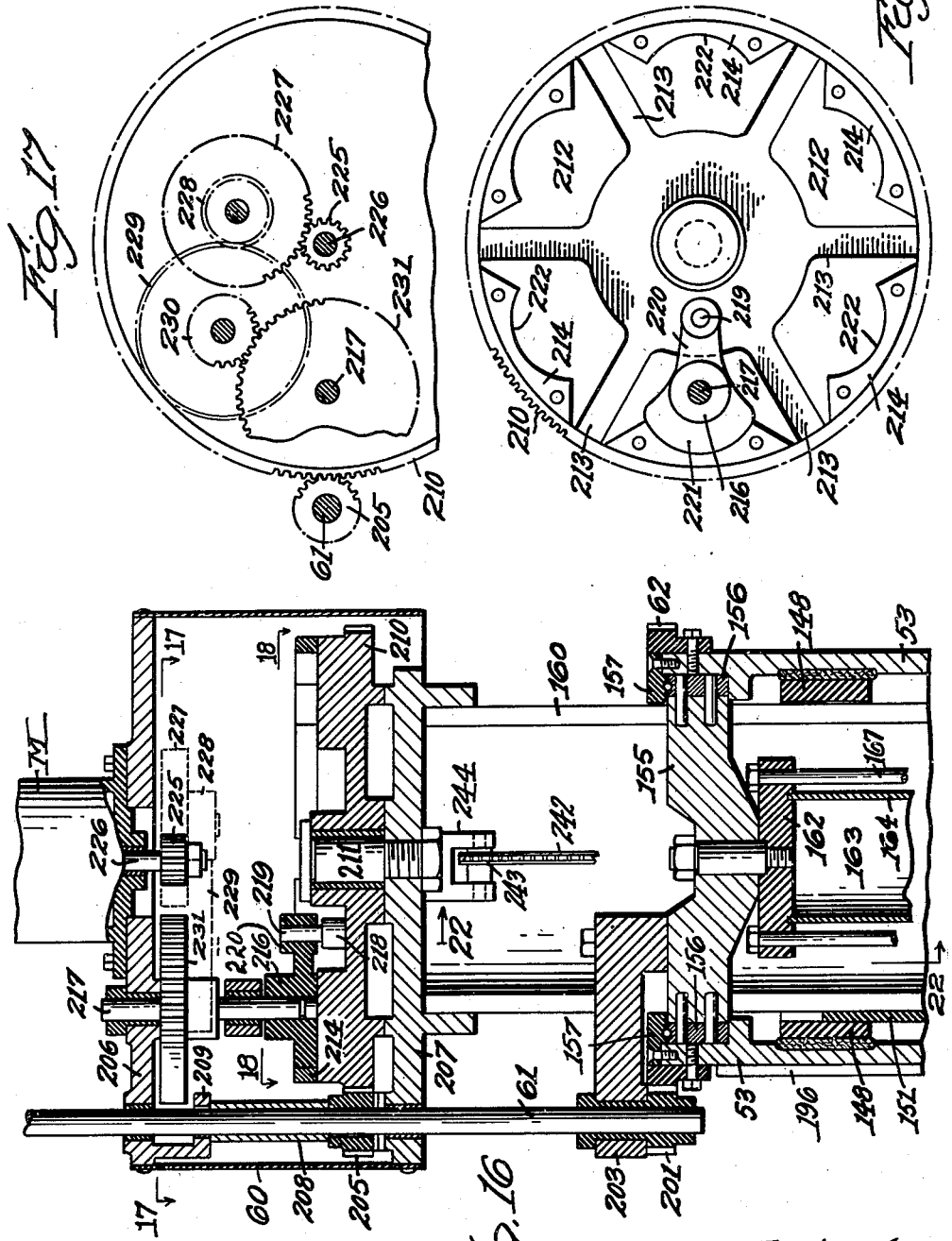

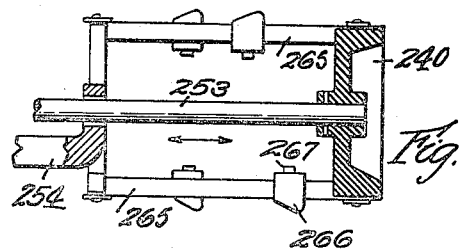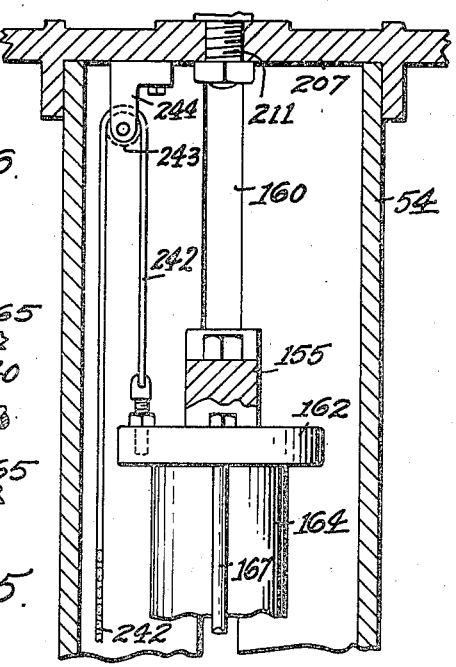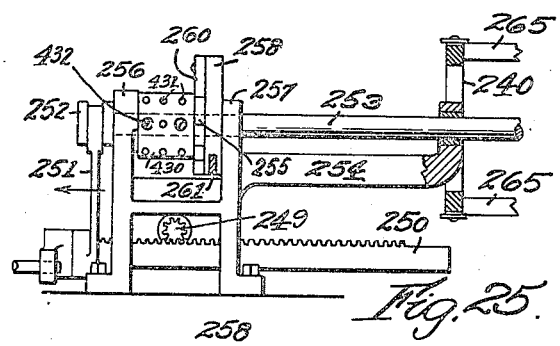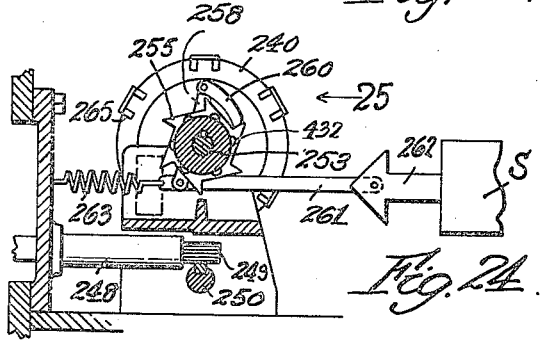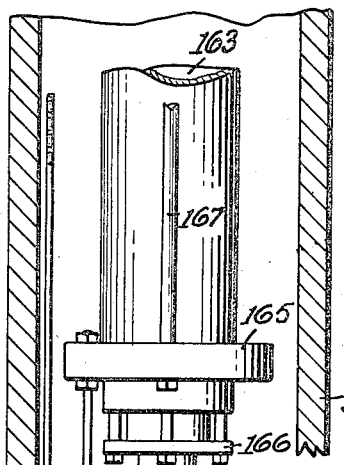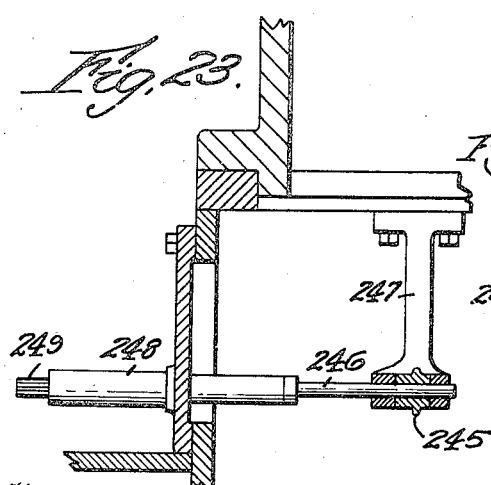

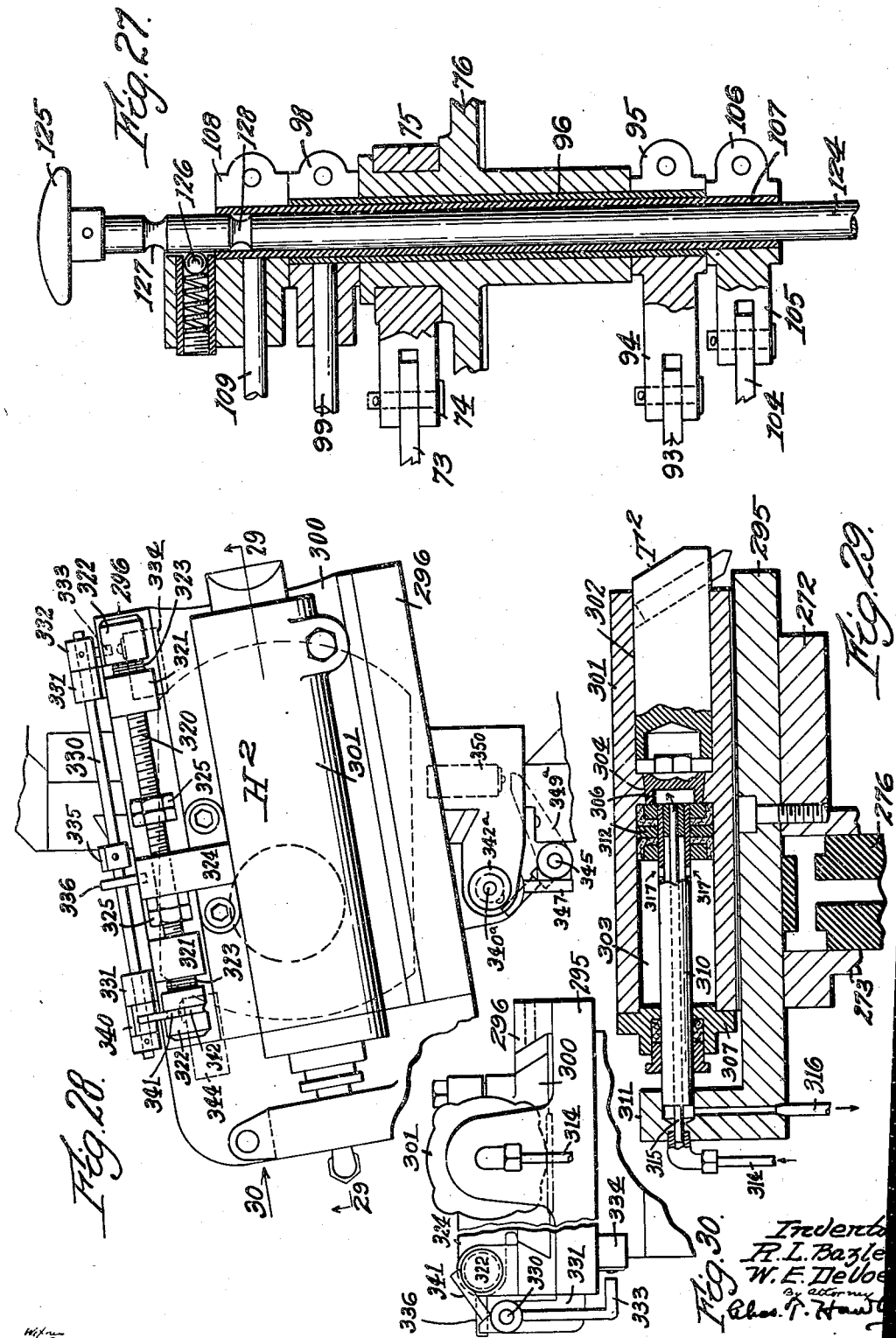

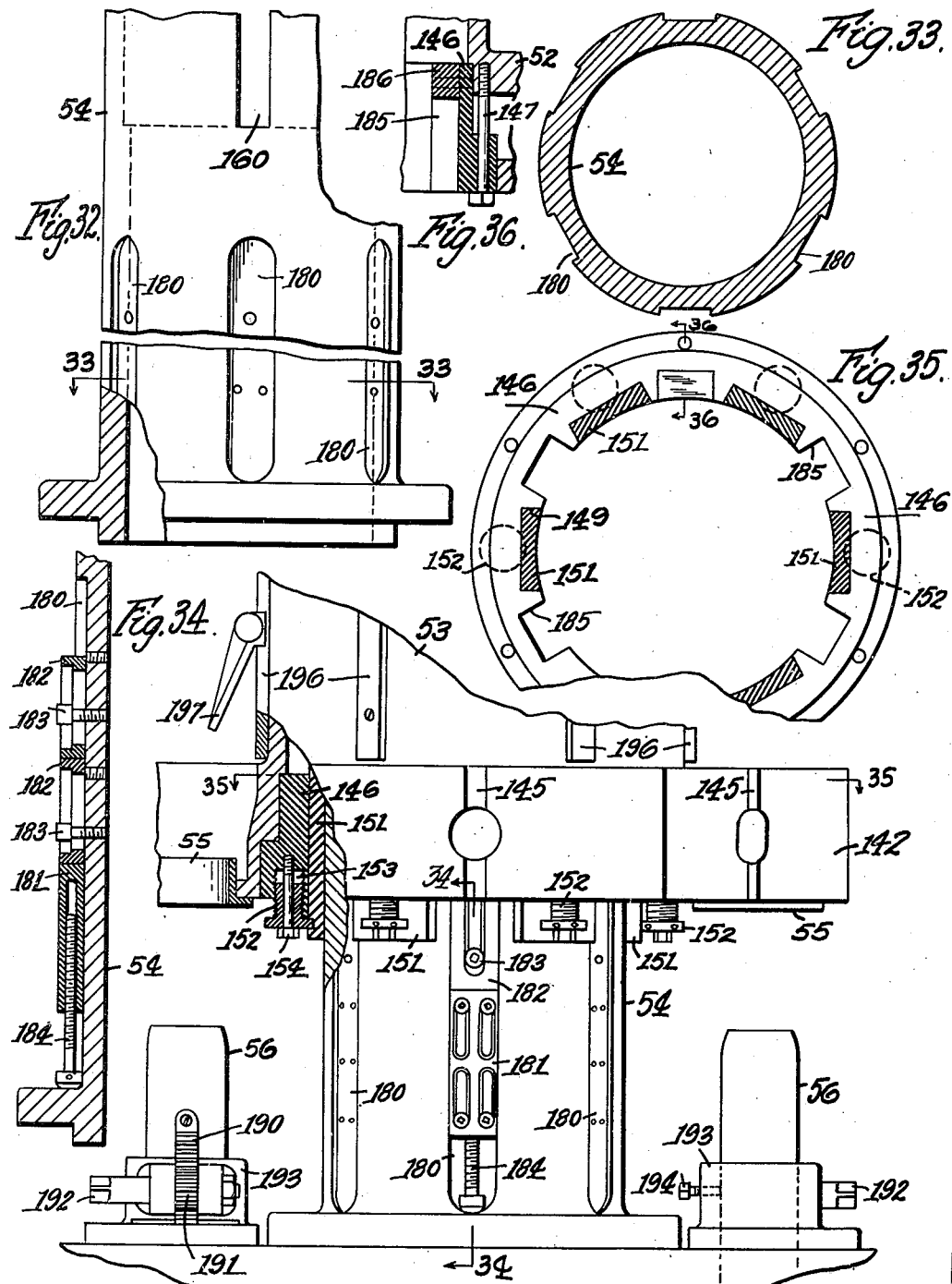

Nov. 13, 1945.    R. L. BAZLEY ET AL    2,389,019
VERTICAL TURRET MACHINE TOOL
Filed May 25, 1940    12 Sheets-Sheet 12

Fig. 37.

Inventors
Ralph L. Bazley
William E. DeVoe.

Patented Nov. 13, 1945

2,389,019

UNITED STATES PATENT OFFICE 2,389,019

VERTICAL TURRET MACHINE TOOL

Ralph L. Bazley and William E. De Voe, Detroit, Mich.

Application May 25, 1940, Serial No. 337,218

7 Claims. (Cl. 29—42)

This invention relates to machine tools adapted for turning, boring, reaming and other machine operations, and relates particularly to a machine tool of the type in which the work is mounted on a spindle rotating about a vertical axis, and in which the tools are mounted in a vertically slidable turret head which is moved toward and from the work and which may also be intermittently indexed to bring successive tools to operative angular position.

A machine of this general type is shown in the prior patent to Tweddell No. 1,783,637, issued December 2, 1930.

It is the general object of our invention to provide an improved machine tool of the type described, by which accurate and satisfactory work may be economically produced.

We have also provided improved automatic control devices of our improved machine tool, which devices cause the various operations of the machine to take place automatically in a definite and predetermined order.

Another feature of our invention relates to the provision of auxiliary or side tool heads, and to improved actuating mechanism and controls for operating said side heads for vertical or horizontal cuts.

We have also provided improved turret structure, improved automatic indexing apparatus, and an improved spindle drive.

Our invention further relates to arrangements and combinations of parts which will be hereinafter described and more particularly pointed out in the appended claims.

A preferred form of the invention is shown in the drawings, in which

Fig. 1 is a partial side elevation of our improved machine;

Fig. 2 is a partial front elevation, looking in the direction of the arrow 2 in Fig. 1;

Fig. 3 is a partial plan view on an enlarged scale, looking in the direction of the arrow 3 in Fig. 1;

Fig. 4 is a sectional side elevation, showing the work spindle and taken along the line 4—4 in Fig. 3;

Fig. 5 is a vertical sectional view of the work spindle drive, taken along the line 5—5 in Fig. 3;

Fig. 6 is a sectional plan view, taken along the line 6—6 in Fig. 5;

Fig. 7 is a detail plan view, looking in the direction of the arrow 7 in Fig. 5;

Fig. 8 is a side elevation of parts of the gear-shifting apparatus, looking in the direction of the arrow 8 in Fig. 6;

Fig. 9 is a front elevation of a side head adapted for making a vertical cut, as in facing a vertical cylindrical surface;

Fig. 10 is a sectional side elevation, taken along the line 10—10 in Fig. 9;

Fig. 11 is a partial plan view, looking in the direction of the arrow 11 in Fig. 10;

Fig. 12 is a front elevation of a side head adapted for taking a swinging cut over a horizontal surface;

Fig. 13 is a sectional side elevation, taken along the line 13—13 in Fig. 12;

Fig. 14 is a partial plan view, looking in the direction of the arrow 14 in Fig. 13;

Fig. 15 is a detail plan view, looking in the direction of the arrow 15 in Fig. 13;

Fig. 16 is a sectional side elevation of the index head and the upper part of the turret sleeve and column;

Fig. 17 is a partial sectional plan view, taken along the line 17—17 in Fig. 16;

Fig. 18 is a sectional plan view, showing the Geneva motion and taken along the line 18—18 in Fig. 16;

Fig. 19 is a sectional side elevation, taken along the irregular line 19—19 in Fig. 3 and showing the turret head and sleeve and the hydraulic actuating mechanism therefor;

Fig. 20 is a sectional plan view, taken along the line 20—20 in Fig. 19;

Fig. 21 is a detail view of a switch to be described;

Fig. 22 is a sectional side elevation of the turret column, showing certain parts mounted therein;

Fig. 23 is a detail sectional side elevation, looking in the direction of the arrow 23 in Fig. 22;

Fig. 24 is a sectional end elevation of a control drum and associated parts;

Fig. 25 is a partial side elevation thereof, looking in the direction of the arrow 25 in Fig. 24;

Fig. 26 is a sectional side elevation showing the operation of the control drum;

Fig. 27 is a sectional plan view of certain manually operated devices for selectively controlling the work spindle speed;

Fig. 28 is a plan view of a modified side head construction designed for both horizontal and vertical cuts;

Fig. 29 is a sectional side elevation thereof, taken along the line 29—29 in Fig. 28;

Fig. 30 is an end elevation, taken in the direction of the arrow 30 in Fig. 28;

Fig. 31 is a side elevation, partly in section, of parts of the turret head and column, showing the devices for adjusting the slide fit of the turret head and sleeve on the turret column, and also showing the devices for selectively limiting downward travel of the turret head;

Fig. 32 is a partial side elevation, partly in section, of the lower end of the turret column;

Fig. 33 is a sectional plan view, taken along the line 33—33 in Fig. 32;

Fig. 34 is a detail sectional elevation, taken along the line 34—34 in Fig. 31;

Fig. 35 is a sectional plan view of certain parts, taken along the line 35—35 in Fig. 31;

Fig. 36 is a detail vertical section, taken along the line 36—36 in Fig. 35; and Fig. 37 is a diagrammatic view of hydraulic and electric actuating mechanism and controls for our improved machine tool.

General construction

The general construction of our improved vertical turret machine tool may be briefly described as follows:

A piece of work W (Fig. 1) is clamped in a chuck 50 of any ordinary commercial design and is continuously rotated at a selected speed by driving mechanism shown in detail on sheets 3 and 4 of the drawings. One or more tools T, up to the capacity of the machine, are mounted in a turret head 52 (Fig. 2) having an upwardly prolonged cylindrical bearing sleeve 53 and slidable vertically on a fixed turret column 54. Bushings 55 in the head 52 coact with guidepins 56 fixed on the frame F of the machine to accurately align the tools in correct relation to the axis of rotation of the work chuck.

Hydraulic mechanism to be described constitutes power means for raising and lowering the turret head 52, and suitable stop devices are provided for limiting the upward and downward movements thereof.

An indexing mechanism 60 is provided at the top of the turret column 54 and this indexing mechanism communicates through a sliding shaft 61 (Fig. 1) with a gear 62 fixed to the top of the turret sleeve 53. The indexing mechanism 60 is thus operative to index the turret head 52 in any vertical position thereof. A separate motor M (Figs. 1 and 2) is provided for driving the index mechanism.

In addition to the turret head, our improved machine is preferably provided with auxiliary or side tool heads, as H and H' (Fig. 3). The side head H is designed to face a vertical internal or external cylindrical surface, and the side head H' is designed to take a swinging cut over a horizontal surface but is also capable of manually controlled hydraulic vertical adjustment.

The side head H may be replaced by the side head H² shown in detail in Figs. 28, 29 and 30 (sheet 10), which latter side head is capable of making a straight cut in either a vertical or horizontal direction as may be desired. This combination may also be used in place of the side head H' and its operating mechanism which is shown in Figs. 12 to 15.

Our improved machine also has special hydraulic and electric actuating and control devices which cause the various operations of the machine to take place automatically and in a predetermined order.

Work drive and work speed control

The work drive for our vertical turret machine tool includes the manually controlled speed changing mechanism shown in detail on sheets 3 and 4, which we will now describe.

Power for driving the work spindle 65 is furnished by a continuously operated motor M' (Fig. 5) which also drives a pump P which supplies liquid under pressure for moving the turret head and for operating other hydraulic mechanism to be described. The motor M' is shown as having a small multiple pulley 66 connected by belts 67 to a larger multiple pulley 68 loose on a countershaft 69 (Fig. 6) but connectible thereto by a clutch 70.

The clutch 70 is controlled by an arm 71 (Fig. 6) mounted on a fixed pivot 72 and connected by a link 73 to an arm 74 on a collar 75. The collar 75 is rotatably mounted on a fixed bearing bracket 76 and is provided with a handle 77 (Fig. 3) by which the clutch may be shifted to engage the driving pulley 68 with the countershaft 69.

Change gears 80, 81, and 82 (Fig. 6) are keyed to the shaft 69 and are selectively slidable as a unit thereon. These gears selectively engage intermediate gears 83, 84 and 85 respectively, which gears are fast on an intermediate shaft 86 mounted for free rotation. A second set of change gears 87, 88 and 89 are keyed to a pinion shaft 90 and are selectively slidable as a unit thereon.

By shifting the first set of change gears, the gears 80 and 83, 81 and 84, or 82 and 85 may be engaged, giving three different speeds to the intermediate shaft 86. By similarly shifting the second set of change gears, the gears 83 and 87, 84 and 88, or 85 and 89 may be engaged, thus giving nine selective speeds for the pinion shaft 90.

The first set of change gears 80, 81 and 82 is controlled by a yoke 91 (Fig. 6) fixed on a rod 92 slidable in fixed bearings and connected by a link 93 (Fig. 8) to an arm 94 on a collar 95 (Fig. 6) clamped to the end of a sleeve 96 which in turn is rotatable in the bearing bracket 76 previously described. The sleeve 96 extends outward through the bearing bracket as shown in Fig. 27 and is provided at its outer end with a collar 98 and handle 99 (Fig. 3) by which it may be manually operated to shift the gears 80, 81 and 82 axially to a selected position.

The second set of change gears 87, 88 and 89 may be shifted by a yoke 100 (Figs. 6 and 7) which is mounted on a slide 101 having a pin-and-slot connection through a lever 102 and rod 103 to a link 104 (Figs. 6 and 8). The link 104 is pivotally connected to an arm 105 on a collar 106 clamped to a sleeve 107 rotatably mounted within the sleeve 96 previously described. The sleeve 107 extends outward as indicated in Fig. 27 and has a collar 108 clamped to its outer end and provided with a handle 109 (Fig. 3) by which it may be selectively operated to engage any one of the change gears 87, 88 and 89.

Any usual device (not shown) may be provided to yieldingly hold the clutch 70 in engaged or disengaged position and to hold both sets of change gears in selected positions.

A pinion 110 (Fig. 6) is fixed on the shaft 90, and a recessed clutch member 111 is secured to the outer end of the shaft 90 beyond the pinion 110. The pinion 110 engages a gear 112 on a countershaft 113, which in turn is provided with a pinion 114 engaging a gear 115 loosely mounted on a shaft 116 having a bevel gear 117 secured to its outer end. The gear 115 is provided with a recessed clutch member 118.

A double-faced coacting clutch member 120 (Figs. 5 and 6) is keyed to the shaft 116 and may be moved axially thereon by a yoke 121 (Fig. 6)

mounted on a bell crank 122 having a fixed pivot 123 and connected to a pull rod 124. The rod 124 is slidable in the sleeve 197 (Fig. 27) and has a knob 125 at its outer end by which it may be pushed in or pulled out to cause the double clutch member 120 to engage either the clutch element 111 or 118 (Fig. 6) selectively.

When the knob is pushed in to engage the member 120 with the member 111, there is a direct drive from the pinion shaft 90 to the bevel gear shaft 116, but when the member 120 is engaged with the clutch element 118, there is an indirect drive from the pinion shaft 90 to the bevel gear shaft 116 through the compound gears 110, 112, 114 and 115. A spring-pressed ball 126 (Fig. 27) is mounted in the hub of the collar 108 and coacts with grooves 127 and 128 in the rod 124 to hold the clutch member 120 in a selected position. If the clutch member 120 is moved to the mid-position shown in Fig. 6, there will be no rotation of the bevel gear 117.

We thus provide eighteen operating speeds of the bevel gear 117, which speeds may be manually selected by manipulation of the pull knob 125 and the change gear handles 99 and 109.

The gear 117 (Fig. 5) engages a bevel gear 130 fixed on the work spindle 65, which spindle is thereby positively rotated. The spindle 65 is mounted in upper and lower thrust bearings 131 and 132. The outer casing of the upper bearing 131 is mounted in a plate or disc 133 having a spherical bearing seat in a fixed plate 134, and is secured in adjusted position in said plate by clamping devices 135 and clamping screws 136.

The lower thrust bearing 132 is mounted in a sleeve 138 which is preferably formed integral with the plate 133 and which is loosely inserted through a fixed ring 139. The ring 139 is provided with a plurality of screws 140 by which the sleeve 138 may be radially adjusted. By loosening the clamping screws 136 and turning the adjusting screws 140, the axis of the work spindle 65 may be adjusted exactly parallel to the path of movement of the turret head 52. When thus adjusted, the clamping screws 136 are tightened to maintain the adjustment.

*Turret head and column*

The turret head 52 is shown herein as designed to hold six different tools and to have six different operative positions. The head 52 is of hexagonal shape with a six-sided vertical outer wall 142 (Fig. 2) and with a flat disc-like bottom 143 in which the guide bushings 55 are seated for cooperation with the fixed guide pins 56. Tool-holding devices 144 may be clamped to the flat sides of the head 52 and support tools T in operative position. Vertical grooves 145 (Fig. 3) assist in correctly positioning the tool holders.

The cylindrical upward extension or turret sleeve 53 is spaced substantially from the turret column 54, as shown in Figs. 19 and 20 (sheet 8). A gib ring 146 (Figs. 19 and 36) is mounted in the lower face of the turret head 52 and is firmly secured therein by clamping bolts 147. A corresponding ring 148 is secured in the sleeve 53 near its upper end, and these rings 146 and 148 have spaced recesses 149 (Fig. 35) which provide slightly tapered bearing surfaces for a plurality of adjustable gibs 151.

Gib-adjusting nuts 152 (Figs. 19 and 31) are mounted in threaded openings 153 in the bottom of the gib ring 146, and the flanged heads of the nuts 152 project into transverse slots in the gibs 151, thus providing means for accurately and closely adjusting the gibs lengthwise. Lock screws 154 are provided to securely retain the adjustment. The gibs 151 (Fig. 35) are curved on their inner faces to fit the cylindrical outer surface of the column 54.

A vertically moving cross head 155 (Fig. 16) is fixed in a ring 156 mounted for rotation in an annular bearing in the upper end of the turret sleeve 53. An antifriction bearing ring 157 is clamped above the ring 156 and prevents upward displacement thereof. The cross head 155 is slidable in vertical slots 160 (Figs. 16 and 32) in the upper portion of the turret column 54 and is guided thereby.

The cross head 155 is bolted to a plate 162 (Fig. 16) forming the upper end of a turret cylinder 163 (Fig. 19) which comprises the head 162, a tubular casing 164, a lower head 165, a packing gland 166 and a plurality of tie rods 167 by which the heads and casing are assembled.

A fixed piston 170 is mounted at the upper end of a tubular piston rod 171 which is supported on a fitting 172 (Figs. 5 and 37) fixed in the frame F of the machine. Ports 173 (Fig. 19) are provided in the hollow piston rod 171 to supply or exhaust oil from the lower portion of the cylinder 163. A pipe 175 is mounted in spaced relation within the piston rod 171 and extends upward through the piston 170 to communicate with the cylinder space above the piston. A pipe 176 (Fig. 5) is connected through the fitting 172 to the lower end of the tubular piston rod 171.

Operative connections to the pipes 175 and 176 will be hereinafter described. For the present it is sufficient to state that when oil or liquid under pressure is admitted through the tubular piston rod 171, the cylinder 163, cross head 155 and turret head 52 will be forced downward for a working stroke, while admission of oil through the pipe 175 will force these parts upward on a return stroke.

Special provision is made to provide a positive stop to limit downward movement of the turret head 52 in each of its six operative positions and to adjust the height of the turret head at a desired point or limit for each position and operation. For this purpose, the turret column 54 (Fig. 32) is provided with six vertical recesses 180, each of which is adapted to receive adjusting blocks 181 (Figs. 31 and 34) and one or more filler blocks 182. The blocks 181 and 182 are slotted to receive binding screws 183, and the adjusting blocks 181 have adjusting screws 184 threaded in their lower ends, by which latter screws the blocks 181 may be accurately adjusted vertically. The spacer blocks 182 rest on top of the adjusting blocks 181 and are positioned and supported thereby.

The gib ring 146 (Fig. 35) is provided with cut-out portions or recesses 185 to clear the limit blocks 181 and 182. A stop 186 (Fig. 36) is permanently fixed in the gib ring 146 at the upper end of one of the recesses 185, and this stop progressively engages the upper end of an adjusting or spacer block in each recess 180 and thus positively limits the downward movements of the turret head at points independently selected for each operation. Upward movement of the head and sleeve is limited by fixed stop blocks 188 (Figs. 1 and 2).

It is sometimes desirable to change the height of the guidepins 56 and for this purpose we provide rack bars 190 (Fig. 31) which are engaged by pinions 191 on short shafts 192 rotatable in bearings in the fixed blocks 193 in which the guidepins are mounted. The shafts 192 have squared ends to which a wrench may be applied for adjustment. When properly adjusted, the guide-pins 56 may be secured by set-screws 194 (Fig. 31) or in any other convenient manner.

A switch 195 (Fig. 21) is mounted in the recessed top of one of the guide-pins 56. The turret sleeve 53 (Figs. 19 and 20) is provided with a vertical bar 196 for each operative station, and a switch-engaging finger 197 is clamped to each bar in vertically adjusted position and engages the switch 195 as the turret head reaches its lower limit of travel for each successive tool. Such engagement occasions a shift of the turret head actuating devices to neutral and then to reverse, as will be later explained.

Indexing mechanism

The mechanism for intermittently indexing the turret head and sleeve will now be described.

For this purpose, the ring gear 62 (Fig. 16), fixed to the upper end of the turret sleeve 53, is engaged by a pinion 201 secured to the lower end of the sliding shaft 61 previously mentioned, which rod is rotatable in a bearing block 203 fixed to the cross head 155, the pinion and shaft being mounted for vertical movement with the cross head but not movable axially relative thereto.

The shaft 61 extends upward into the index mechanism 60 which is mounted at the upper end of the fixed turret column 54. The shaft 61 extends loosely through a pinion 205, which pinion, however, is keyed to the shaft 61 and rotates therewith. The shaft 61 is also rotatable in upper and lower bearings in the heads 206 and 207 of the index mechanism 60, and the pinion 205 is held from upward movement by a sleeve 208 engaging a downward projection 209 of the upper head 206.

The pinion 205 meshes with a large gear 210, mounted for intermittent angular movement on a stud 211 fixed in the lower index head 207. On its upper surface, the gear 210 is provided with Geneva blocks 212 separated by channels 213 and having locking plates 214 secured on their upper faces. The blocks 212 and plates 214 form one part of a Geneva intermittent drive.

The other element of the Geneva drive comprises a member 216 fixed at the lower end of a shaft 217 which rotates in fixed bearings and which supports the member 216 just above the blocks 212. A roll 218 is mounted below the member 216 on a stud 219 fixed in an arm 220 projecting outward from said member. The member 216 is also provided with a flange 221 (Fig. 18), the outer surface of which is concentric with the shaft 217 and is also concentric with the segmental inner surface 222 of each block 214 when associated therewith.

As the member 216 is given a single rotation by the motor M, the roll 218 enters one of the channels 213 and advances the gear 210 one-sixth of a revolution. As the advance movement is completed, the flange 221 assumes concentric relation with the segmental surface of the associated locking plate 214, and the gear 210 is thus held motionless until the motor M is again energized to give the shaft 217 another revolution.

The motor M is connected to the shaft 217 through a train of gears comprising a pinion 225 (Fig. 17) on the armature shaft 226, which pinion engages and drives a gear 227 having an associated pinion 228 which engages and drives a gear 229. The pinion 230 associated with the gear 229 engages a gear 231 on the Geneva shaft 217.

Our provision for controlling the index motor M and for stopping the same after one revolution of the Geneva shaft 217 will be hereinafter described. For present purposes, it may be stated that the index motor is started on each return upward movement of the turret head, and that each time the motor is operated, the head will be advanced one-sixth of a revolution to its next operative position. If less than the full number of tools is in use, provision may be made for causing the motor to advance the turret head two or more steps before further downward movement of the turret head.

Tool feed control

We have provided special mechanism for controlling the rate of feed of the tools during their operative strokes, which mechanism will provide a rapid approach, a coarse feed, and a fine feed, or any desired combination of these motions for each tool in the turret head.

This feed control mechanism is shown in detail on sheet 9 and diagrammatically in Fig. 37.

The essential element of the feed control is a control drum 240 (Fig. 26) which is intermittently fed angularly in association with the turret head 52, and which is moved axially in fixed relation to the vertical movement of said turret head.

In order to produce the synchronous axial movement, we provide a sprocket chain 242 (Fig. 22), the opposite ends of which are connected to the upper cylinder head 162 and to the lower cylinder head 165 respectively. The chain 242 passes around a sprocket 243 mounted on a fixed bracket 244 at the top of the column 54 and also around a sprocket 245 mounted on a shaft 246 rotatable in a bearing in a fixed bracket 247 below the lower end of the turret column 54.

The shaft 246 extends through an elongated bearing sleeve 248 and is provided with a pinion 249 at its inner end, which pinion engages a slidable rack bar 250 (Fig. 25). A yoke arm 251 on the rack bar 250 engages a grooved collar 252 on a drum shaft 253 which is slidable and also rotatable in a bearing bracket 254 and which is connected at its outer end to the outer head of the drum 240 (Fig. 26).

With these connections, it will be evident that upward or downward movement of the cylinder 163 which raises and lowers the turret head 52 will produce corresponding and proportional axial movements of the drum 240.

The drum 240 is indexed by a ratchet wheel 255 which is keyed to the shaft 253 but otherwise loose thereon, thus permitting relative axial movement but preventing relative angular movement between the ratchet wheel and the shaft. The ratchet wheel is mounted between fixed bearing arms 256 and 257. A feed lever 258 is loosely mounted on the shaft 253 adjacent the ratchet wheel 255 and is provided with a feed pawl 260 engaging the teeth of the ratchet wheel. The end of the lever 258 is connected by a link 261 to the outer end of a solenoid plunger 262, slidable in a solenoid coil S. A tension spring 263 is connected to the free end of the link 261.

When the solenoid is energized, the link 261 is moved to the right, as shown in Fig. 24, thus retracting the feed pawl to engage the next ratchet tooth. When the solenoid circuit is broken, the spring 263 pulls the link 261 to the left, advancing the feed pawl and turning the ratchet wheel 255 and drum 240 sixty degrees.

This feeding movement is synchronized with the indexing of the turret head in a manner to be hereinafter described.

The drum 240 is provided with a pair of bars 265 for each operative position of the turret head 52, there being six pairs of bars 265 in the present embodiment of our invention. Cam blocks 266 are slidably mounted on the bars 265 and may be adjustably secured in selected positions by clamping screws 267. As the control drum 240 moves axially to the left in Fig. 26 or to the right in Fig. 37, the cam blocks 266 engage successive switches which operate in a manner to be described to control the rate of downward movement of the turret head during the operation of each successive tool.

*Side head construction*

The construction and operation of the side head H is shown on sheet 5, this type of head being ordinarily used to machine a vertical internal or external cylindrical surface. The side head H comprises a holder 270 (Fig. 10) for a tool T', which holder is clamped to a plate 271 which is clamped to the flanged upper end portion 272 of a vertically slidable cylinder 273 and forms the upper head of said cylinder. The cylinder is provided with dove-tailed guides 274 (Fig. 11) at each side thereof, which guides are mounted in fixed but adjustable guideways 275 associated with the fixed base or frame F of the machine.

An elongated plug 276 (Fig. 10) fills the upper part of the cylinder 273 and is provided with an axial passage 277 open at its lower end and communicating with a cross passage 278 at its upper end. The plug 276 is also reduced in diameter at its upper end to provide an annular port 280, to which a supply pipe 281 (Fig. 9) is connected. A vent hole 282 (Fig. 10) through the plate 271 may be opened to allow air to escape from the cylinder 273 but is closed during normal operation by a ball 283 and screw 284.

A second supply pipe 285 is connected through the lower head 286 to the lower part of the cylinder 273. A fixed piston 290 is mounted at the upper end of a fixed piston rod 291 and is slidable relative to the lower portion of the cylinder 273. When oil under pressure is admitted above the piston 290, the tool holder 270 will be raised, and when the connections are reversed the tool holder will be lowered.

Normally the tool T' is in lowered position and below the work and makes its cut on its upward stroke, but the method of operation may be reversed, in which case the tool will be normally maintained in raised position and will move downward for a cutting stroke.

The provision for changing from coarse to fine vertical feed and for reversing the travel of the tool holder is similar to the control of the cross feed in the side head H² shown on sheet 10 and will be described in connection therewith.

The cross head H² (Figs. 28, 29 and 30) is actuated vertically by hydraulic mechanism which may be identical with that shown in Figs. 9 and 10 and above described. The plate 271 in Fig. 10 is, however, replaced by a guideplate 295 (Fig. 29) having horizontal guideways 296 (Fig. 30) for a cross slide 300. The cross slide 300 supports a cylindrical housing 301 having axial cylindrical recesses 302 and 303 (Fig. 29) in its opposite ends, which recesses are separated by an internal partition 304.

The axial recess 302 is provided for holding and clamping a tool T². The axial recess 303 is closed at its inner end by a plug 306 in the partition 304 and at its outer end by a cylinder head 307. A piston rod 310 is fixed in a flange 311 extending upward from one end of the guideplate 295 and is provided with a piston 312 relatively slidable in the axial recess or cylinder 303. A pipe 314 is connected to a tube 315 which extends loosely through the tubular piston rod 310 and is open at its inner end. A second pipe 316 is connected to the annular space between the tube 315 and the tubular piston rod 310, which space is connected by ports 317 to the recess or cylinder 303.

With this construction, admission of oil under pressure through the pipe 314 and tube 315 will move the cross slide 300 to the right in Fig. 29 for a working cut, and admission of oil through the pipe 316 will return the tool slide to withdrawn or inoperative position, it being understood that when either pipe 314 or 316 is under pressure the other pipe will be open to exhaust.

The means for shifting from rapid approach or coarse feed to fine feed and for thereafter reversing the tool travel will now be described.

For this purpose a rod 320 (Fig. 28) is slidably mounted in bearings 321 on one of the fixed guideways 296, and said rod is provided with caps 322 at its ends and with springs 323 interposed between the bearings 321 and the caps 322. The rod 320 also extends loosely through a hole in a lug 324 projecting outward from the cross slide or tool holder 301, and the rod 320 is provided with two sets of lock nuts 325 threaded thereon.

A second rod 330 is rotatably mounted in bearings 331 fixed on the guideplate 295. A collar 332 is fixed to the rod 330 and is provided with a downwardly projecting offset arm 333 (Fig. 30) adapted to engage and close a switch 334.

A cam block 335 is also mounted on the rod 330 and may be secured in any selected axial position thereon. A pin 336 projects outward from the lug 324 on the cross slide 301 and engages and depresses the cam block 335 as the slide 301 moves axially. When the cam block is depressed, the rod 330 is thereby moved angularly, causing the arm 333 to close the switch 334 and shift the feed from rapid approach or coarse feed to fine feed.

A collar 340 (Fig. 28) is loosely mounted on the rod 330 and is provided with a pin 341 normally resting in a groove 342 in the left-hand rod cap 322. An arm similar to the arm 333 projects downward from the collar 340 in position to engage and close a switch 344 which operates to stop and reverse the tool slide travel.

The closing of this switch 344 takes place when either set of lock nuts 325 on the rod 320 is engaged by the lug 324. Such engagement will move the rod 320 axially far enough to displace the pin 341 from the groove 342, thus rocking the arm connected with the collar 340 and closing the switch 344. The electrical connections for the switches 334 and 344 will be hereinafter described.

The mechanism shown in Figs. 9 and 28 for controlling the vertical travel of the cylinder 273 is substantially identical with the mechanism above described for the control of the cross feed.

Briefly described, Fig. 9 discloses a rod 340ª mounted in fixed bearings and provided with lock nuts 341ª by which a grooved cap 342ª is moved axially to close the switch 343ª to stop or reverse the vertical travel, all as previously described. Similarly, a second rod 345 is rotatably mounted in fixed bearings and is provided with a cam block 346 engageable by a pin 347 as a lug 348 on the cylinder 273 moves lengthwise of the rod 345. When thus engaged, the rod 345 is rocked to swing a collar 349 and associated arm 349ª to close a switch 350 and shift the vertical travel from rapid approach or coarse feed to fine feed, all as previously described.

If no change is feed is desired, the cam block 335 or 346 may be moved or turned on its supporting rod to an inoperative position, in which case the tool slide 300 will travel at uniform speed throughout its horizontal movement, or the cylinder 273 will travel at uniform speed throughout its vertical movement.

The construction of the swinging or horizontal surfacing side head H' is shown on sheet 6 and comprises a tool holder 352 (Fig. 13) mounted at the top of a tool column 353, which column is mounted for angular movement in a slide plate or holder 354, slidable in vertical guideways 355. The lower end of the column 353 extends through a bushing 357 (Fig. 13). The column is freely slidable in the bushing but is keyed thereto to prevent relative angular movement between the column and bushing. The bushing is rotatably mounted in a fixed bearing 358 and is held from axial movement therein.

An arm 360 is formed on or secured to the lower end of the bushing 357 and at its outer end is pivotally connected by a link 361 to a cylinder 362 mounted to slide relative to a fixed piston not shown. The cylinder and piston construction may be similar to that shown in Fig. 29.

Provision is made for selectively supplying oil at one side or the other of the fixed piston in the cylinder 362, whereby the cylinder will move endwise and the arm 360 will move angularly and will communicate this angular movement through the column 353 to the tool holder 352 and to the tool T³ carried thereby. The tool T³ is thus given a swinging movement toward and from the axis of the work, whereby a horizontal surfacing cut is achieved.

Vertical adjustment of the tool holder is accomplished by the provision of a fixed piston 365 (Fig. 13) mounted in the base of the side head H' and slidably fitting a cylindrical recess 366 in the lower end of the column 353. When oil under pressure is supplied through a pipe 367 and an axial passage 368 in the fixed piston, the column 353 acts as a movable cylinder and is upwardly adjusted along with its supporting slide 354.

When the correct vertical position is attained, one of the guideways or gibs 355 may be tightened by screws 370 to hold the tool in adjusted vertical position.

In every vertical position of the tool, however, swinging movement of the arm 360 will be communicated to the column 353 through the keyed connection between the bushing 357 and the lower end of the column.

It will be understood that the side heads H, H' and H² may be used in any desired combinations, or that two heads of the same kind, such as H², may be used on the same machine if so desired.

Control and operation

We will now describe the mechanism for hydraulically actuating and electrically controlling our improved turret machine. Referring to Fig. 37, the pump P is connected through a high pressure relief valve 400 to a pipe 401 leading to a control valve panel 402.

The details of construction of this valve panel form no part of our present invention but may be briefly described as comprising means to connect the supply pipe 401 to the pipe 176 direct for a rapid downward approach movement of the turret head, or through a control valve 403 for coarse feed, or a similar control valve 404 for fine feed. Each of these valves 403 and 404 is manually adjustable for any desired speed.

The described connections are made through angular movement of a valve rod 405 having a handle 406 at its front end and having a cross head 407 and arm 408 at its rear end. The valve rod 405 may be set either manually or automatically in any one of five positions, corresponding to rapid approach, coarse feed, fine feed, neutral, and return.

Automatic control of the valve rod 405 is effected by hydraulic cylinders 410 and 411 containing pistons which engage the opposite ends of the cross arm 407 on the valve rod 405. Oil is supplied to the cylinder 410 or 411 through valves V' and V² selectively operated by solenoids S' and S². When the cylinder 410 is operated, the valve rod 405 is shifted to rapid approach, and when the cylinder 411 is operated, the valve rod is shifted to return.

A speed control rod 420 is connected to the arm 408 on the valve rod 405 and is provided with adjustable dogs 421 adapted to be progressively engaged by latches 422ª, 422ᵇ and 422ᶜ, which latches are controlled by solenoids S³, S⁴ and S⁵ respectively. The solenoid S³ is controlled by a switch K' closable by a cam block 266 adjustable on a rod 265 on the control drum 240 previously described, and the solenoid S⁴ is similarly controlled by a switch K² closable by a cam block 266ª on the second of a pair of parallel rods 265. All three solenoids S³, S⁴ and S⁵ are connected to a triple switch K³, closable by a solenoid S⁶ which in turn is connected to the normally open switch 195 at the top of one of the guide pins 56.

When the control rod 420 is held by the left-hand latch 422ª, the valve rod 405 will be in the position for rapid approach of the tool to the work. When released by operation of the solenoid S³ and engaged by the middle latch 422ᵇ, a coarse feed operation will take place, and when released by the solenoid S⁴ and engaged by the right-hand latch 422ᶜ, a fine feed operation will take place.

When all three latches are withdrawn by operation of the solenoid S⁵, the valve rod 405 will be returned to mid or neutral position. When the solenoid S² is energized, oil will be admitted to the cylinder 411, shifting the valve rod 405 in the opposite direction to return position and connecting the pump P to the pipe 175 for a return stroke. Spring-pressed plungers 425 act as centering devices and one of these plungers always acts to move the valve rod 405 toward neutral position when the rod is released.

The automatic operation of our improved machine comprises a rapid downward approach movement of the turret head, a coarse feed movement, a fine feed movement, stop and reversal at the bottom of the stroke, a return upward movement, indexing of the turret head, indexing of the control drum, and repetition of the cycle until the turret head has made a complete revolution, at which time the machine will stop with the turret head in raised position.

The electric control by which this automatic operation is accomplished comprises a clutch-operated switch K⁴, a starting switch K⁵, a double switch K⁶ which is reversed as the turret head is indexed, a second double switch K⁷ which is reversed as the turret head approaches its upward limit of travel, a drum index switch $K^8$ which controls the solenoid S previously described, and a double switch $K^9$ which controls the circuit through the solenoid $S^2$.

The method of operation is as follows:

The clutch 70 is first closed manually by use of the handle 77 (Fig. 3) and by so doing the clutch operated switch $K^4$ is closed. Until this switch is closed, it is not possible to start the turret-operating or indexing mechanism.

After the switch $K^4$ has been closed by engaging the clutch 70, the starting switch $K^5$ is closed manually, which energizes the solenoid S' and causes the valve V' to shift the valve rod 405 to the extreme position for a rapid approach movement of the turret head. This movement of the valve rod 405 is accomplished by a swinging movement of the arm 408 and by simultaneous movement of the control rod 420 to extreme left-hand position, where it is retained by the left-hand latch $422^a$.

Closing of the starting switch $K^5$ also energizes a magnetic relay R' which closes a shunt circuit around the switch $K^5$ and holds this shunt closed, even if the switch $K^5$ is opened before the control rod 420 is operatively positioned. As the control rod reaches extreme left-hand position, the dog 423 engages and opens a switch $K^{10}$ in series with the starting switch $K^5$ and relay R', thus breaking the circuit of the solenoid S', even if the starting switch is held closed.

At a predetermined point in the downward travel of the turret head, the switch K' is closed by the cam block 266, releasing the control rod 420 and allowing one of the spring plungers 425 to move the control rod one space to the right to coarse-feed position. At a further predetermined point, the switch $K^2$ is closed by a block $266^a$, energizing the solenoid $S^4$ and withdrawing the second latch so that the control rod and valve will be moved to fine feed position.

If it is desired to operate entirely at fine feed, both solenoids $S^3$ and $S^4$ may be energized at the same time, in which case the control rod 420 will not stop at coarse feed position but will be moved at once to the fine feed position. Similarly, the closing of the switch $K^2$ may be omitted, so that the entire operation will take place at coarse feed.

When the downward travel of the turret head is completed, the switch 195 in the guidepin will be closed, energizing the solenoid $S^6$ to close the triple switch $K^3$ and withdraw all three latches $422^a$, $422^b$ and $422^c$, so that the control rod and valve rod may be moved to mid or neutral position. The closing of the switch 195 also closes the circuit through the solenoid $S^2$, which then moves the valve $V^2$ and connects the pump P through the control valve panel to the pipe 175 for upward or return travel of the turret head. A time-delay relay D permits the machine to dwell long enough to clear out the cut before reversal.

Closing of the switch 195 also energizes a magnetic relay $R^2$ which closes a shunt circuit around the switch 195 and holds this shunt circuit closed after the turret head starts to move upward and the switch 195 opens. The lower double switch $K^7$ is reversed by axial movement of the drum 240 as the turret head approaches its upper limit of travel.

At the end of the upward travel of the turret head, the double switch $K^9$ is automatically reversed, thus breaking the shunt circuit through the relay $R^2$ and solenoid $S^2$, and partially completing a circuit through the drum index switch $K^8$. The shifting of the switch $K^9$ also completes the operating circuit for a solenoid $S^7$ which controls the index motor M (Fig. 1) thereby causing the turret head to be indexed.

The switch $K^8$ is positioned for intermittent engagement by the turret head 52 during each indexing movement thereof and is temporarily closed thereby, thus energizing the drum index solenoid S and withdrawing the feed pawl 260. When the switch $K^8$ opens, the feed pawl effects an annular index movement of the control drum 240.

As the turret head completes its indexing movement, the upper double switch $K^6$ is reversed, breaking the index motor solenoid control circuit. As the turret head starts down, the switch $K^9$ returns to the initial position shown in Fig. 37.

The switches $K^6$ and $K^7$ have a three-wire connection, and are each reversed once in each full cycle of turret movement. Reversal of the switch $K^6$ breaks the index motor control circuit and subsequent reversal of the switch $K^7$ again closes the circuit. A control device on each face of the turret head reverses the switch $K^6$ and breaks the circuit as the associated face is operatively positioned.

The control drum shaft 253 (Fig. 25) is provided with a collar 430 having three annular series of tapped holes 431 in which screws 432 may be inserted. As the control drum is successively advanced, the heads of these screws successively engage and close switches $K^{11}$, $K^{12}$ and $K^{13}$ (Fig. 37). The middle series of screws engages the switch $K^{11}$ and controls the repeated automatic operation of the turret head and associated parts. The switch $K^{11}$ is in parallel with the starting switch $K^5$, so that when the switch $K^{11}$ is closed, the machine is automatically started on the same cycle as when the switch $K^5$ is manually closed. The two outer series of screws, through the switches $K^{12}$ and $K^{13}$, control the operation of the side heads.

Ordinarily only a single screw will be inserted in an outer series, closing the switch $K^{12}$ or $K^{13}$ once only during a complete revolution of the turret head and control drum, but a screw will usually be provided in the middle series for each face of the turret head except the last, unless certain tool positions are not being used, in which case the corresponding screws and the corresponding control devices on the turret head will be omitted and the index mechanism will advance the turret head two or more stations, as desired. The screw is omitted for the last face so that the machine will stop when the work piece is finished.

The machine can be stopped at any time in the cycle by pressing the double pole emergency stop switch $K^{14}$ (Fig. 37) which breaks the circuit of the solenoid $S^2$ and closes the circuit of the solenoid $S^6$. The valve rod 405 is then moved immediately to neutral position by the centering plungers 425.

In Fig. 37 we have also indicated in part the automatic control of the side heads and particularly of one of the side heads $H^2$ having both vertical and horizontal hydraulic feed.

For the purposes of this explanation, it may be stated that a wire 450 (Fig. 37) connects the side head control switch $K^{12}$ to a solenoid $S^{12}$ which controls the hydraulic connections to a side head $H^2$. When the switch $K^{12}$ is closed by a screw in the drum shaft collar 430, the solenoid S¹² operates a four-way valve V³ to admit oil under pressure to the pipe line 452 and to connect the pipe line 453 to the storage tank. The oil lines 452 and 453 are connected to the vertical cylinder 273 and horizontal cylinder 301 through a valve panel having three reversible four-way valves 454, 455 and 456 and a metering valve 457.

Let it be assumed that the machine is set up for outside turning of a cylindrical surface, with the cut to be made in an upward direction. Normally the side head assembly is at its lowest position, with the lug 348 bearing on the stop nuts 341a (Fig. 9). The horizontal head H² is also in the position shown in Fig. 28, with the lug 324 stopped against the lock nuts 325. With the valves set as shown, oil under pressure from the pipe 452 will be delivered to the upper end of the cylinder 273 through the pipe 281 and to the outer end of the cylinder 301 through the pipe 316.

When pressure is applied in the upper end of the vertical cylinder 273 (Fig. 9) through the pipe 281, it is also applied in the outer end of the cylinder 301 (Fig. 29) through the pipe 314. This causes a simultaneous movement of both the vertical and horizontal slides. The horizontal head H² will be moved forward to the front lock nuts 325 and will be retained there by pressure. At the same time, the entire assembly will move upward in rapid advance until the pin 347 engages the feed control cam 346. The vertical motion will then be continued at a slower cutting rate until the upper lock nuts 341a engage the stop 348, at the same time operating the switch 343a to reverse the oil pressure. This reversal of pressure is effective on both the vertical and the horizontal cylinder, with the result that the head H² is withdrawn as the side head assembly starts downward, and with no tool mark left on the finished surface. The fine feed switch 350 is used only when a vertical cut is being taken.

The same procedure is followed when the head H² is used for a horizontal facing cut. The lock nuts 341a are then adjusted to allow only the necessary vertical movement for tool clearance and the lock nuts on head H² are adjusted for the desired horizontal cutting stroke. When pressure is applied to the system, the complete assembly moves vertically, either up or down as required, bringing the tool to proper cutting depth. At the same time, the tool begins to advance in rapid approach to the work.

As the tool holder is thus advanced horizontally, the switch 334 will be actuated at a selected point in the tool travel. When this occurs, a solenoid S¹⁴ (Fig. 37) is actuated through electrical connections not shown and shifts the discharge from the open return pipe 453 to a pipe 460 which receives oil from the horizontal cylinder only through the metering valve 457. Further movement of the tool holder is thus at a reduced or fine feed rate.

At the end of the tool cut, the switch 344 is engaged, which reverses the oil flow through electrical connections not shown and restores the side head parts to initial position. On reversal of pressure, the tool is first lifted from its cutting position and is then withdrawn without marking the work.

Similar control structure is provided for the second side head but is not shown in detail herein. The valves 454, 455 and 456 (Fig. 37) control the pressure supply to the side heads and may be set in any desired combinations and the metering valve 457 may be adjusted to vary the speed of the cutting stroke.

Having thus described our invention and the advantages thereof, we do not wish to be limited to the details herein disclosed, otherwise than as set forth in the claims, but what we claim is:

1. In a vertical turret machine tool, a continuously rotating work support, a tool-holding turret head, means to move said head vertically, an index mechanism mounted in fixed vertical position and operative to index said head in every vertical position thereof and including an index plate, means to intermittently advance said plate angularly, an upper gear associated with said plate, a lower and similar gear on the turret head, and a positive gear connection between said upper and lower gears operative to index said head in every vertical position thereof, said connection including a pinion for each gear and a shaft connecting said pinions, said shaft being fixed to one pinion and being slidable but non-rotatable relative to the other pinion.

2. In a vertical turret machine tool having a fixed frame, a continuously revolving work support, a turret head with a plurality of angularly spaced tool stations, means to vertically reciprocate said turret head and means to index said turret head, that improvement which consists in providing an auxiliary side tool head separately mounted on said fixed frame and spaced from said turret head and comprising a tool holder, power means to swing said tool holder about a vertical axis for a cutting stroke, means to adjust said tool holder vertically, and control means to coordinate the movements of the turret head and the side head tool holder in the predetermined relation.

3. In a vertical turret machine tool having a turret head supporting a plurality of work-engaging tools, in combination, apparatus to feed said head at a plurality of predetermined speeds, a control rod for said apparatus, selective devices to hold said rod in a plurality of operating positions, and means to release all of said selective devices at the lower end of the working stroke of each tool.

4. In a vertical turret machine tool having a continuously revolving work support, a work spindle, a turret head with a plurality of angularly spaced tool stations, means to vertically reciprocate said turret head and means to index said turret head, that improvement which consists in providing a driving clutch for said work spindle, and interlocking control devices which prevent operation of the turret head and index means until said clutch is closed.

5. In a vertical turret machine tool having a continuously revolving work support, a turret head with a plurality of angularly spaced tool stations, means to vertically reciprocate said turret head and means to index said turret head, that improvement which consists in providing a control shaft, means to give said shaft angular advance movements in accordance with the index movements of said head, a hub on said shaft and a series of contacts mounted in an annular series on said hub and each determining the feed changes of the machine for a corresponding angular position of the turret head.

6. The combination in a turret machine tool as set forth in claim 5 which includes an auxiliary side head for said machine tool and a second annular series of contacts determining the time of operation of the side head with respect to the angular position of the turret head.

7. In a vertical turret machine tool having a turret head with a plurality of operating faces, a fixed turret column, means to index said head on said column and means to vertically reciprocate said head on said column, that improvement which comprises a single stop member fixed on said movable head. and an adjustable block and a plurality of removable spacer blocks mounted on said fixed turret column for each operating face of the turret head, said single stop member engaging one of said spacer blocks to limit the downward movement of said head in each angularly spaced operative position of said head.

RALPH L. BAZLEY.
WILLIAM E. DE VOE.